United States Patent

Cortes Guasch et al.

Patent Number: 5,461,964
Date of Patent: Oct. 31, 1995

[54] POWER-ASSISTED STEERING WITH AUTOMATIC COMPENSATION FOR CLEARANCE

[75] Inventors: Esteve Cortes Guasch, Barcelone; Raimon Soler Bruguera, Granollers, both of Spain

[73] Assignee: Bendix Espana S.A., Barcelone, Spain

[21] Appl. No.: 133,073

[22] PCT Filed: Sep. 13, 1993

[86] PCT No.: PCT/EP93/02473

§ 371 Date: Oct. 12, 1993

§ 102(e) Date: Oct. 12, 1993

[87] PCT Pub. No.: WO94/08835

PCT Pub. Date: Apr. 28, 1994

[30] Foreign Application Priority Data

Oct. 15, 1992 [ES] Spain .................................. 9202047

[51] Int. Cl.[6] .................................. F15B 9/10; B62D 5/06
[52] U.S. Cl. .................. 91/375 R; 91/380; 92/DIG. 1; 92/DIG. 2; 180/132
[58] Field of Search .................. 91/368, 375 R, 91/375 A, 380; 92/DIG. 1, DIG. 2; 180/132

[56] References Cited

U.S. PATENT DOCUMENTS

| | | | |
|---|---|---|---|
| 3,868,888 | 3/1975 | Rehfeld | 91/375 R X |
| 4,128,046 | 12/1978 | Roseu | 91/375 A |
| 4,202,249 | 5/1980 | Jablonsky et al. | 91/380 X |
| 5,205,372 | 4/1993 | Kotake et al. | 180/132 |

FOREIGN PATENT DOCUMENTS

| | | | |
|---|---|---|---|
| 0299250 | 1/1989 | European Pat. Off. . | |
| 467333 | 1/1992 | European Pat. Off. | 180/132 |
| 2117360 | 6/1972 | France . | |
| 1760196 | 10/1956 | United Kingdom . | |
| 2027399 | 2/1980 | United Kingdom | 91/375 R |

*Primary Examiner*—Edward K. Look
*Assistant Examiner*—Hoang Nguyen
*Attorney, Agent, or Firm*—Larry J. Palguta; Leo H. McCormick, Jr.

[57] ABSTRACT

A roller-contact bearing device with a reduced clearance for a power-assisted steering system having a first roller-contact bearing for absorbing axial forces exerted on a steering shaft and a second roller-contact bearing for transmitting the axial forces to a casing. The second roller-contact bearing is urged toward shaft by an spring disc to oppose the axial forces being applied to the shaft.

6 Claims, 4 Drawing Sheets

POWER-ASSISTED STEERING WITH AUTOMATIC COMPENSATION FOR CLEARANCE

The present invention relates to a roller-contact bearing device with reduced clearance for a power-assisted steering system of the type of those which comprise:

a casing having a sealed internal volume which at least partially assumes the form of a cylinder of revolution about an axis;

a shaft housed in the internal volume of the casing along the direction of this axis, translationally fixed along this direction and rotationally driven about this axis, from the outside of the casing, by the application of an input torque on a first of its two ends;

a piston sliding axially in the internal volume of the casing so as to separate this volume into two sealed pressure chambers subjected to respective pressures varying as a function of the said input torque, these pressures exerting on the piston a translational force which can be converted into an output torque; and a movement converter, arranged between the piston and the shaft in the vicinity of the second end of the latter, so as to convert a rotational movement of the shaft into a translational movement of the piston, the shaft thus being subjected to axial forces of variable intensity and direction as a function of the input torque, and this device comprising at least a first roller-contact bearing arranged between the first end of the shaft and the casing so as to transmit to the latter the axial forces being exerted on the shaft from its second end towards the first.

Such devices are used in power-assisted steering systems of the type described for example in U.S. Pat. No. 4,128,046, and are essentially composed either of a special roller-contact bearing or one which has been the subject of a selection, or of a more ordinary roller-contact bearing whose clearance has been reduced by virtue of multiple settings.

Whatever the solution adopted, the roller-contact bearing devices with reduced clearance currently in use have the drawback of being costly, and of only showing maximum efficiency at the time of mounting, wear being likely to degrade their performance.

In this context, the object of the present invention is to provide a roller-contact bearing device of the type previously defined, but endowed with automatic clearance compensation, that is to say exempt from setting and adjustment, and having great stability over time.

To this end, the device of the invention is essentially characterized in that it further comprises a second roller-contact bearing arranged between the first end of the shaft and the casing, as well as elastic means bearing on the casing so as to exert on the shaft, via the second roller-contact bearing, an axial force directed from the second end of this shaft towards the first, and of greater intensity than the axial forces in the opposite direction to which this shaft is subjected.

The elastic means, especially for reasons of cost and bulk, may advantageously comprise a non-planar disc spring commonly referred to as a belleville washer which provides elastic resistance when forced to into a planar position.

In one possible embodiment, the shaft has in the vicinity of its first end a radial widening, the casing has at a region situated between the two ends of the shaft a radial narrowing, and the second roller-contact bearing and the said elastic means are arranged between the radial widening of the shaft and the radial narrowing of the casing, the second roller-contact bearing therefore preferably being a needle bearing.

In another possible embodiment, the shaft has, in the vicinity of its first end, an annular peripheral groove of right triangular cross section, forming two conical rolling surfaces centered on the axis, a first of these two surfaces being rather turned towards the first end of the shaft and the second surface being rather turned towards the second end of the shaft; the casing is therefore designed so as to offer, facing the first rolling surface, a third rolling surface, parallel to the first, a removable ring being arranged around the shaft in the immediate proximity of the third rolling surface so as to offer a fourth rolling surface facing the second and parallel to it; moreover, first rollers are arranged between the first and third rolling surfaces so as to roll thereon and to form the said first roller-contact bearing, second rollers are arranged between the second and fourth rolling surfaces so as to roll thereon and to form the said second roller-contact bearing, and the elastic means force the said ring in a direction which tends to move the fourth rolling surface closer to the second.

It is moreover preferable, in order to take into account the respective intensities of axial forces acting on the shaft, to provide for the first rollers to be more numerous than the second rollers.

Other characteristics and advantages of the invention will emerge clearly from the description which is given below, by way of example and in no way limiting, with reference to the appended drawings in which.

By convention, any pair of mechanical components which, in operation, are integral with one another may, for reasons of conciseness and clarity, be considered in the present description and/or in the claims which it supports as constituting one and the same component, the man skilled in the art being in a position, on the basis of the drawings and/or of his experience, of recognizing, when it appears, the necessity for providing an assembly of two components instead of one for the manufacture and/or mounting of the device.

Figure 1:
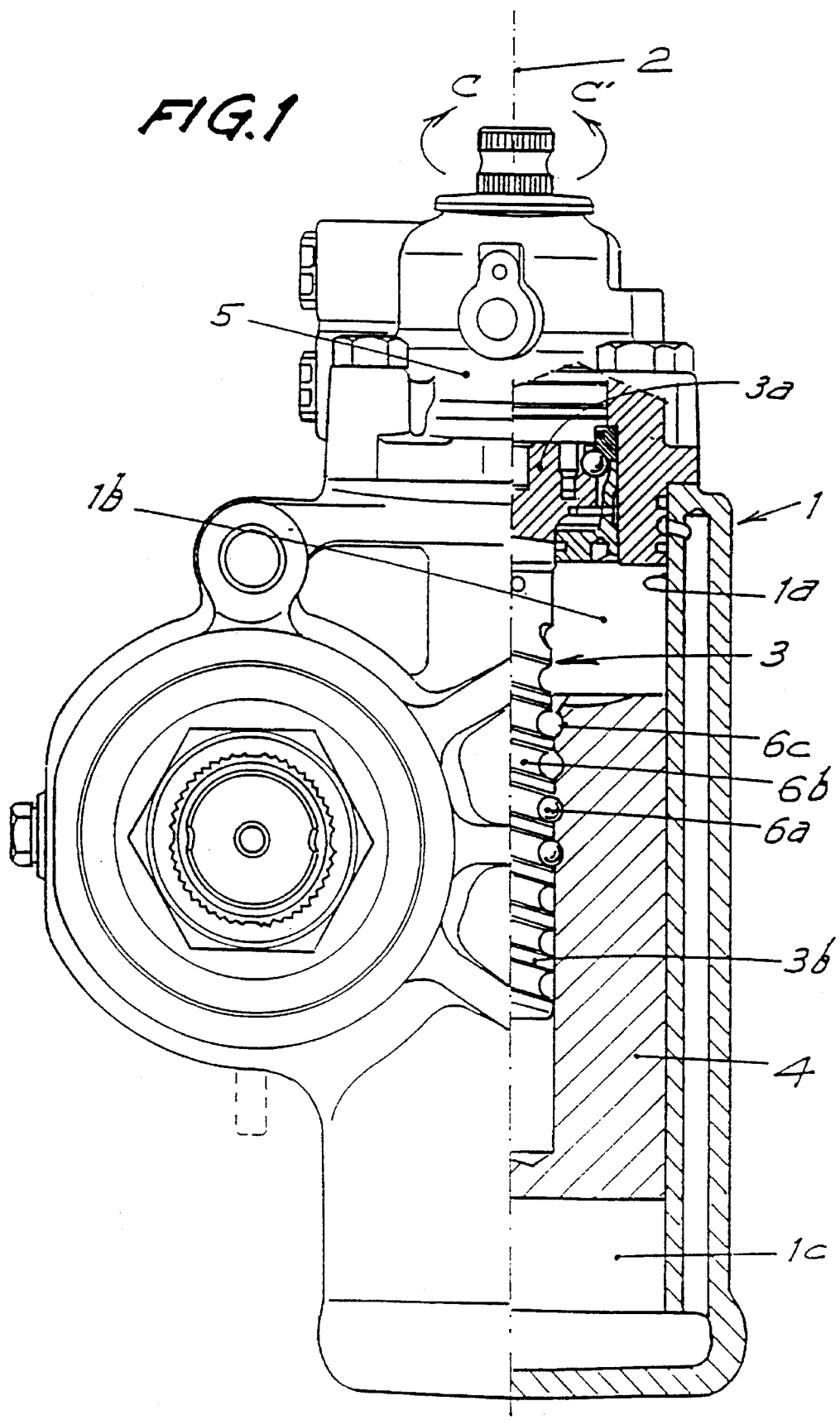
FIG. 1 represents a device in accordance with a first embodiment of the invention, replaced in the whole of its operational context.

FIG. 1 represents, in partial section, a power-assisted steering system for a motor vehicle, implementing the invention.

Such a system firstly comprises a casing 1 defining a sealed internal volume at least part of which assumes the shape of a cylinder of revolution 1a about an axis 2.

A shaft 3 is housed in the internal volume of the casing along the direction of the axis 2, translationally fixed along this axis, and capable of being rotationally driven about this same axis by the application, to a first of its ends 3a, of a torque C or C' coming from a rotational effort on the steering wheel of the vehicle and transmitted via the casing 1.

A piston 4, surrounding the shaft 3 on the side of its second end 3b, slides axially in the internal volume of the casing so as to separate the latter into two sealed pressure chambers 1b, 1c; the latter are subjected to respective pressures controlled by a hydraulic directional control valve 5 actuated by the shaft 3 and therefore varying as a function of the direction and of the intensity of the torque applied to this shaft.

The difference between these pressures, being exerted on the piston 4, is capable of driving the latter in translation along the axis 2, in one direction or the other, this movement being converted, via gearing (not visible) with rack and toothed sector, into an output rotational movement transmitted to the wheels of the vehicle.

A movement converter essentially formed of balls 6a, circulating in helical paths 6b, 6c respectively hollowed, facing one another, into the external surface of the shaft 3 and into the internal surface of the piston 4, enables a rotational movement of the shaft to be converted into a translational movement of the piston, especially so as to obtain an output rotational movement even in the event of the hydraulic assistance system breaking down.

Under these conditions, the shaft 3 is subjected, as a function of the intensity and of the direction of the torque which is applied to it, to forces of variable intensity and direction directed along the axis 2.

In reality, the invention originates partly from the observation of the fact that the more significant axial forces to which this shaft is subjected result from the application of different pressures in the chambers 1b and 1c, and that, in so far as the shaft must be sealed at its interface with the atmosphere so as to be able to be moved from the outside of the sealed casing 1, and in so far as one or other of the chambers is always at a pressure greater than atmospheric pressure when the pressure difference between these chambers is not zero, the most significant axial forces to which the shaft 3 is subjected are always directed from its second end 3b towards its first end 3a, that is to say in a direction which tends to cause it to come out of the casing.

The only axial force being exerted on the shaft in the direction going from its first end 3a towards the second end 3b appears during the application to this shaft of a rotational torque tending to bring the piston 4 closer to the first end 3a of this shaft, before this torque has attained the minimum value enabling the actuation of the hydraulic directional control valve 5 and the installation of different pressures in the chambers 1b, 1c.

This axial force is therefore low under normal operation, and its value is easy to determine as it is a direct function of the known value of the actuating torque of the hydraulic directional control valve.

The device may now be described in more detail with reference to FIGS. 2 and 3, FIG. 2 being an enlargement of FIG. 1.

The device firstly comprises a first roller-contact bearing 7, composed of balls 7a, of rolling surfaces 7b, 7c, and of a ball separator 7d.

This roller-contact bearing 7 is arranged between the first end 3a of the shaft and the casing 1 and transmits to the latter the forces which are exerted axially on the shaft in the direction going from its second end 3b towards the first end 3a.

Figure 2:
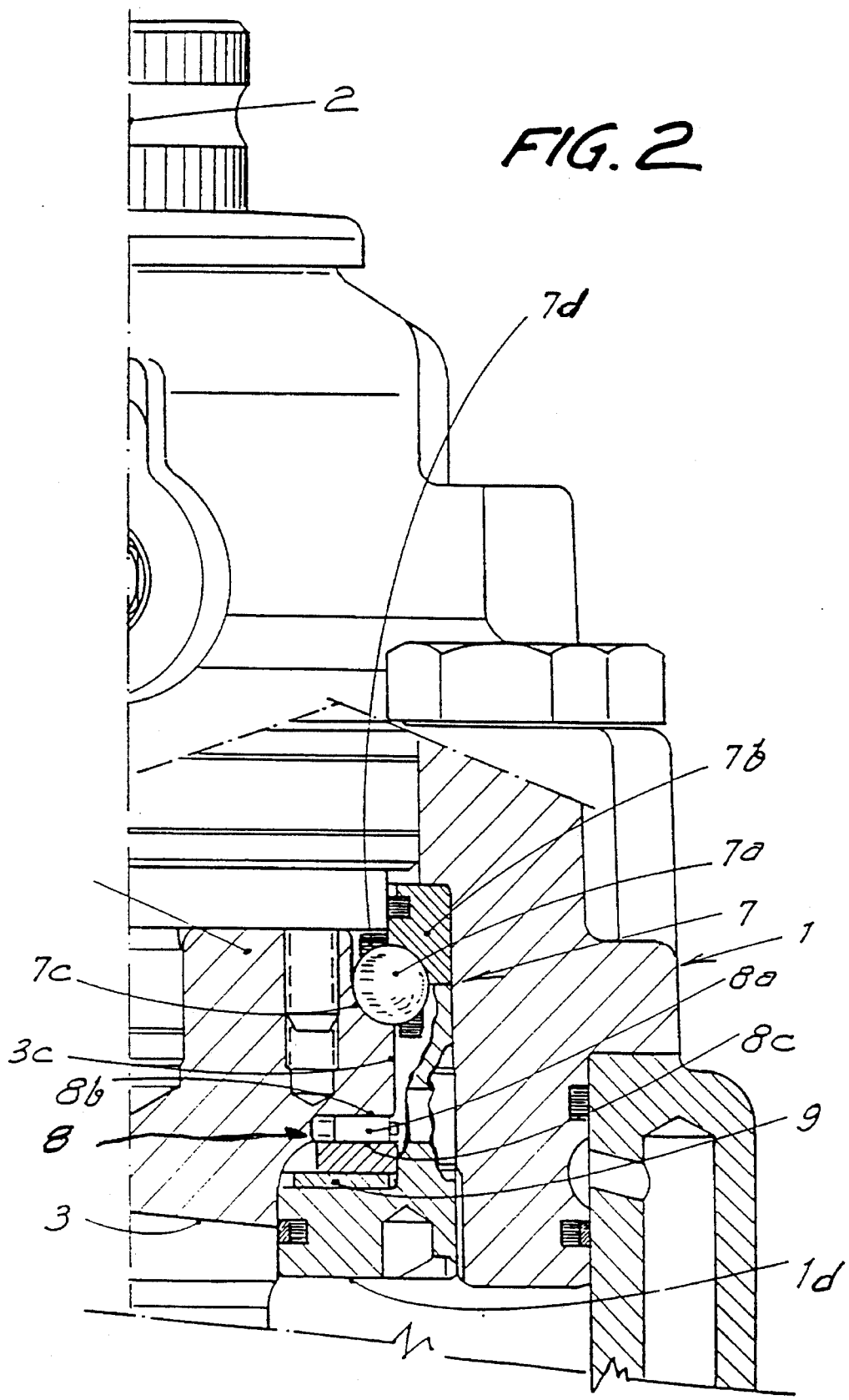
FIG. 2 is an enlarged sectional view coming from FIG. 1 and enabling the structure of the device of the invention to be distinguished in its first embodiment.

As illustrated in FIG. 2, the rolling surface 7b is, for example, offered by a ring surrounding the shaft 3 and bearing against the casing.

In the embodiment of this figure, the shaft 3 has a radial widening 3c in the vicinity of its first end 3a, whereas the casing 1 has a complementary radial narrowing 1d holding the radial widening 3c captive in the casing 1.

The device therefore comprises a second roller-contact bearing 8, comprising needles 8a and rolling surfaces 8b, 8c, the first rolling surface 8b being partly composed of an axial face of the radial widening 3c, the second rolling surface 8c being formed by an attached ring surrounding the shaft 3, and the assembly being trapped between the radial narrowing 1d and the radial widening 3c and forced by an elastic force directed from the second end of the shaft towards the first end by virtue of a prestressed Belleville washer 9, surrounding the shaft, and itself captive between this narrowing 1d and this widening 3c.

The force exerted by the belleville washer can preferably be set, and in this case, is capable of being set by screwing the radial narrowing 1d on the casing 1, and it is adjusted to a value greater than the maximum value of the axial force being exerted on the shaft 3 from its first end 3a towards the second end 3b.

Figure 3:
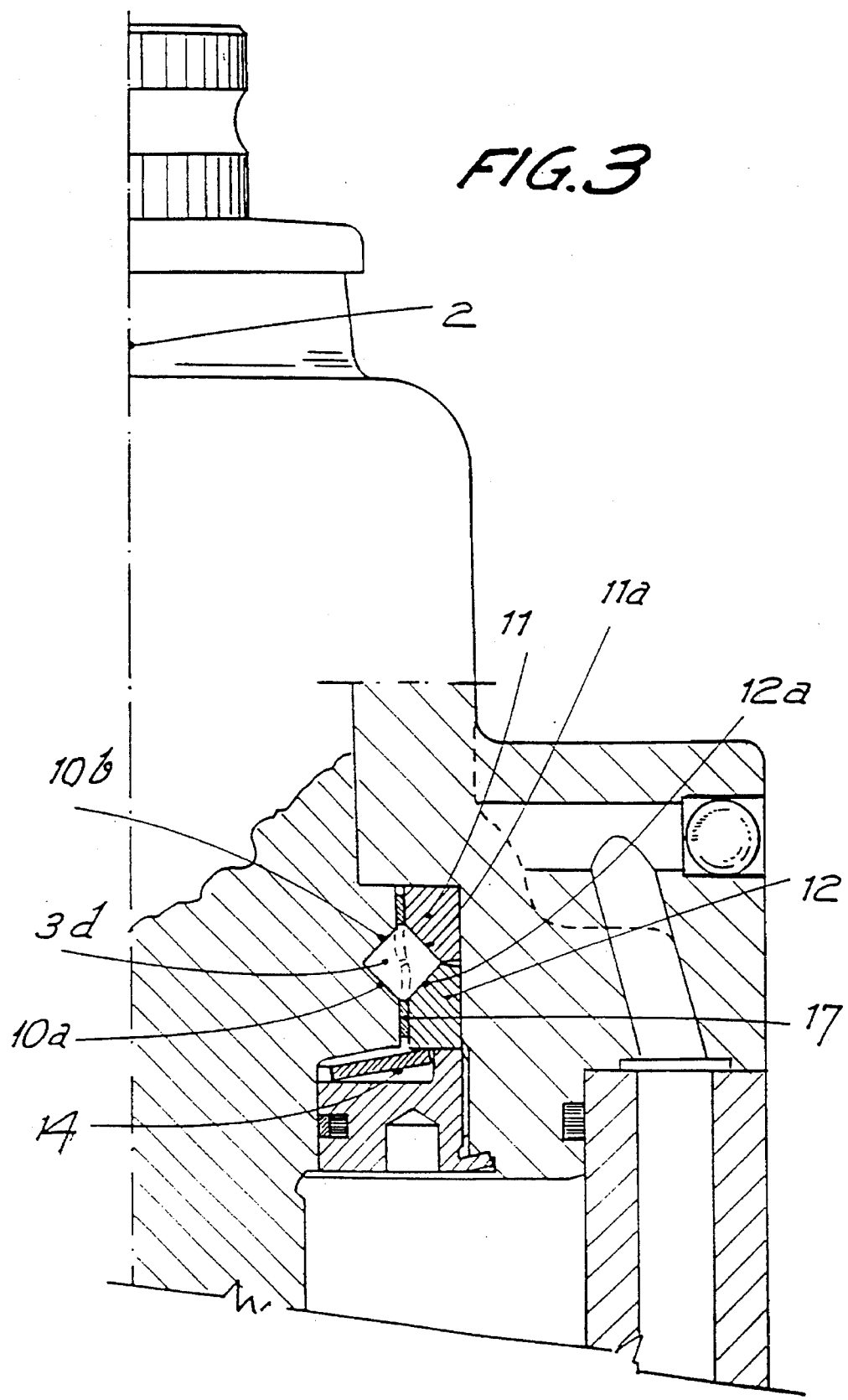
FIG. 3 is a sectional view, similar to FIG. 2, but illustrating a second embodiment of the invention.

In the embodiment of FIG. 3, the shaft 3 has, in the vicinity of its first end 3a, an annular peripheral groove 3d adopting a right triangular cross section and forming two conical rolling surfaces 10a and 10b centered on the axis 2.

The first, 10a, of these two surfaces is rather turned towards the first end 3a of the shaft and for example at 45° with the steering pointing towards this end, whereas the second rolling surface 10b is rather turned towards the other end 3b of the shaft and for example at 45° to the steering pointing towards this end.

A ring 11 surrounding the axis [sic] 3 and bearing on the casing 1 offers a third conical rolling surface 11a centered on the axis 2, arranged facing the first rolling surface 10a, and parallel with the latter.

In a similar fashion, a ring 12 offers a fourth rolling surface 12a facing the second rolling surface 10b and parallel to it, the difference, however, being that the ring 12 does not bear on the casing 1, either in a direct fashion or via the ring 11.

In contrast, the ring 12 is forced towards the ring 11 by an elastic force exerted by a Belleville washer 14 bearing on the casing 1, this force being greater than the maximum axial force being exerted on the shaft 3 in the direction of its second end 3b.

First rollers, such as 15 (FIG. 4), are arranged between the first and second rolling surfaces 10a, 11a in order to roll thereon and to constitute a first roller-contact bearing with them.

In the same way, second rollers, such as 16, are arranged between the third and fourth rolling surfaces 10b, 12a in order to roll thereon and to constitute a second roller-contact bearing with them.

Preferably, the rollers of the two roller-contact bearings are separated by separators 17, the first rollers 15 being more numerous than the second rollers 16 and regularly spaced between the latter.

Figure 4:
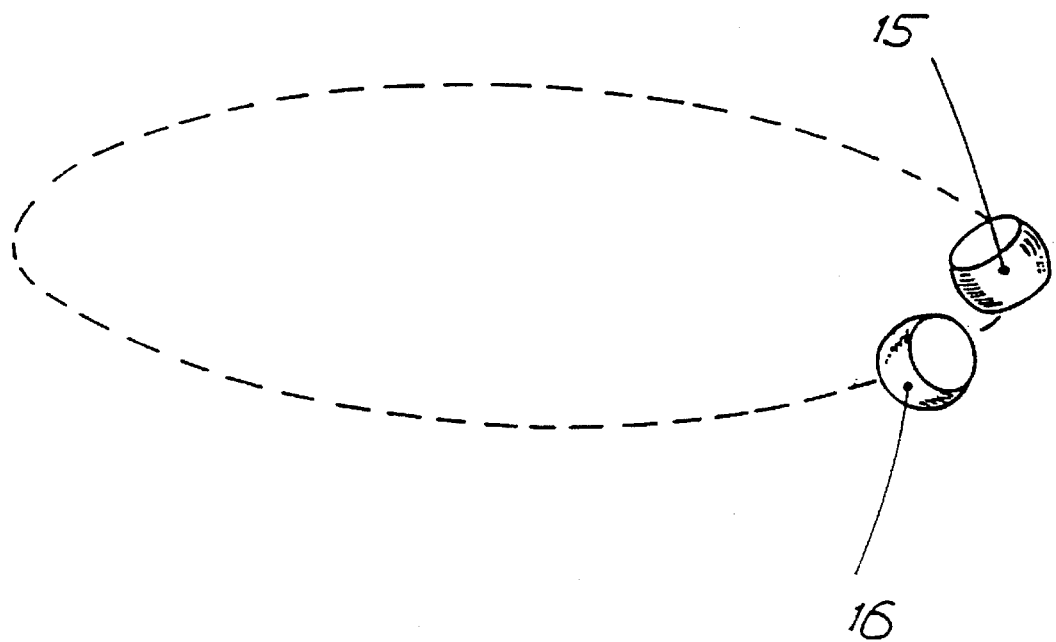
FIG. 4 is a partial view in perspective of a detail relating to the second embodiment of the invention.

The embodiment illustrated in FIGS. 3 and 4 leads to a greatly reduced bulk at a very low manufacturing cost.

We claim:

1. A roller-contact bearing device for use in a power-assisted steering system comprising:

a casing having a sealed internal volume which at least partially defines a cylinder with an axis of revolution;

a shaft housed in said internal volume and translationally fixed along the axis of revolution, said shaft having a first end connected to receive rotational input torque from a source external to said casing and a second end;

a piston for separating said internal volume into first and second sealed pressure chambers, said first and second sealed chambers being subjected to varying pressures as a function of said input torque applied to said first end of said shaft, said varying pressures exerting a transulational force on said piston for the development of an output torque;

a movement converter located between said piston and said second end of said shaft for changing rotational movement of said shaft into transulational movement of said piston, said shaft being subjected to axial forces of variable intensity and direction as a function of said input torque;

a first roller-contact bearing located adjacent said first end of said shaft and said casing to transmit axial forces applied to said second end of said shaft into said casing;

a second roller-contact bearing located adjacent said first end of said shaft and said casing, said second roller-contact bearing automatically compensating for axial clearance between said shaft and casing; and elastic means bearing on said casing for exerting an axial force on said second end of said shaft through said second roller-contact bearing, said second axial force being of greater intensity than and opposing an axial force applied to said first end of said shaft.

2. The roller-contact bearing device as recited in claim 1 wherein said elastic means comprises at least one spring disc.

3. The roller-contact bearing device as recited in claim 1 wherein said first end of said shaft includes a radial widening, said casing includes a radial narrowing in an are between the first and second ends of said shaft and said second roller-contact bearing and said elastic means are located between said radial widening in said shaft and said radial narrowing in said casing.

4. The roller-contact bearing device as recited in claim 2 wherein said second roller-bearing contact is a needle bearing.

5. The roller-contact bearing device as recited in claim 1 wherein said first end of said shaft includes an annular peripheral groove having a right triangular cross section which form first and second conical rolling surfaces centered on aid axis of revolution, said first conical rolling surface being turned toward said first end and said second conical rolling surface being turned toward said second end of said shaft, said casing includes a third rolling surface which faces and is parallel to said first rolling surface, a removable ring which surrounds said axis of revolution adjacent said third rolling surface forms a fourth rolling surface which faces and is parallel to said second rolling surface, first rollers arranged between said first and third rolling surfaces to roll thereon and form said first roller-contact bearing, second rollers arranged between said second and fourth rolling surfaces to roll thereon and form said second roller-contact bearing, and said elastic means acting on said ring to move said fourth rolling surface toward said second rolling surface.

6. The roller-contact bearing device as recited in claim 5 wherein said first rollers are more numerous than said second rollers.

* * * * *